(12) United States Patent
Onaka

(10) Patent No.: US 8,050,574 B2
(45) Date of Patent: Nov. 1, 2011

(54) OPTICAL RECEIVING APPARATUS AND OPTICAL LEVEL ADJUSTED QUANTITY SETTING METHOD THEREFOR

(75) Inventor: Miki Onaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 885 days.

(21) Appl. No.: 12/043,466

(22) Filed: Mar. 6, 2008

(65) Prior Publication Data
US 2008/0226291 A1 Sep. 18, 2008

(30) Foreign Application Priority Data
Mar. 16, 2007 (JP) ................................. 2007-068983

(51) Int. Cl.
*H04B 10/06* (2006.01)
(52) U.S. Cl. ...................................................... 398/210
(58) Field of Classification Search .................. 398/94
See application file for complete search history.

(56) References Cited

U.S. PATENT DOCUMENTS

| | | | |
|---|---|---|---|
| 5,847,862 A | 12/1998 | Chraplyvy et al. | |
| 6,084,694 A * | 7/2000 | Milton et al. | 398/83 |
| 6,885,499 B1 * | 4/2005 | Hoshida et al. | 359/337 |
| 2004/0146302 A1 * | 7/2004 | Balland et al. | 398/94 |
| 2006/0018658 A1 * | 1/2006 | Mori | 398/79 |
| 2006/0203329 A1 | 9/2006 | Nishihara et al. | |
| 2006/0221435 A1 * | 10/2006 | Maeda et al. | 359/337 |

FOREIGN PATENT DOCUMENTS

| | | |
|---|---|---|
| JP | 9-8730 | 1/1997 |
| JP | 2003-198478 | 7/2003 |
| JP | 2006-295113 | 10/2006 |

* cited by examiner

*Primary Examiner* — Shi K Li
(74) *Attorney, Agent, or Firm* — Staas & Halsey LLP

(57) ABSTRACT

The present invention relates to an optical receiving apparatus designed to receive light wavelength-demultiplexed in a wavelength multiplex optical transmission system. The optical receiving apparatus includes an optical level adjusting unit for adjusting a level of light inputted and for outputting the level-adjusted light and a light receiving unit for receiving the light outputted from the optical level adjusting unit. An optical level adjusted quantity in the optical level adjusting unit is set so that the level of light of relatively shorter wavelength band becomes lower than the level of light of relatively longer wavelength band. This enables normal signal light reception to be achieved irrespective of a variation in the number of wavelengths with a simple configuration.

13 Claims, 20 Drawing Sheets

FIG. 3

| WAVELENGTH CONDITION | SIGNAL WAVELENGTH | | POWER FLUCTUATION (ΔP) OF RESIDUAL WAVELENGTH | MAIN FACTOR |
| --- | --- | --- | --- | --- |
| | STEADY STATE | AFTER VARIATION | | |
| 1 | ALL WAVELENGTHS | 1 WAVE (SHORTER WAVELENGTH BAND) | LARGE IN PLUS DIRECTION | SRS, SHB |
| 2 | ALL WAVELENGTHS | 1 WAVE (VICINITY OF CENTER EXCEPT SHORTER WAVELENGTH BAND AND LONGER WAVELENGTH BAND) | SMALL | - |
| 3 | ALL WAVELENGTHS | 1 WAVE (LONGER WAVELENGTH BAND) | LARGE IN MINUS DIRECTION | SRS |
| 4 | ALL WAVELENGTHS | 2 WAVES (SHORTEST AND LONGEST WAVELENGTHS) | SMALL | - |

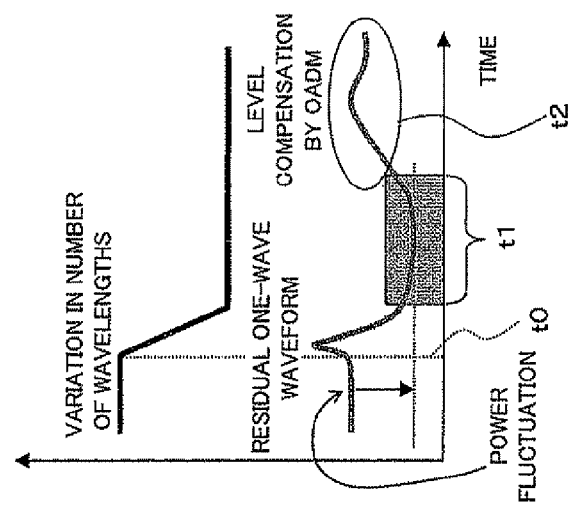

GAIN FLUCTUATION QUANTITY STEMMING FROM SRS
(EXAMPLE OF 40 WAVES → RESIDUAL 1 WAVE)

GAIN FLUCTUATION QUANTITY STEMMING FROM SHB
(EXAMPLE OF 40 WAVES → RESIDUAL 1 WAVE)

OPTICAL RECEIVING APPARATUS AND OPTICAL LEVEL ADJUSTED QUANTITY SETTING METHOD THEREFOR

BACKGROUND OF THE INVENTION

1) Field of the Invention

The present invention relates to an optical receiving apparatus and optical level adjusted quantity setting method used therefore, suitable for use in a wavelength multiplex optical transmission system.

2) Description of the Related Art

In the recent years, as one example of the WDM (Wavelength Division Multiplex) optical transmission systems, attention has been attracted with respect to a metrocore system which makes connections among local based cities and which is capable of carrying out the add/drop of optical signals with arbitrary wavelengths at arbitrary nodes. FIG. 13 is a block diagram showing an example of a configuration of a metrocore system. In this system shown in FIG. 13, a plurality of OADM (Optical Add-Drop Multiplexer) nodes 100 are connected through transmission lines (optical fibers) 400 into a ring-like configuration so that, at each of the OADM nodes 100, a signal light with an arbitrary wavelength (channel) can be added to the transmission line 400 and, of WDM signal light propagating along the transmission lines 400, a signal light with an arbitrary wavelength can be dropped therefrom. In addition, optical amplifiers (pre-amplifier 200 and post-amplifier 300) are respectively provided properly at former and latter stages relative to each of the OADM nodes 100 for making a compensation for loss of signal light level among the OADM nodes (which hereinafter will equally be referred to simply as "nodes") to lengthen the transmission distance.

In a such a system designed to add/drop signal light at an arbitrary node, since the number of signal wavelengths (which will hereinafter be referred to equally as "number of transmission wavelengths") transmitted in the system (transmission lines 400) varies dynamically, in order to maintain constant output optical power of each wavelength (channel) against this wavelength number variation (maintain the gain flat characteristic with respect to wavelength), an AGC amplifier having an automatic gain control (AGC) function is commonly used for each of the above-mentioned amplifiers 200 and 300.

In this case, for example, as shown in FIG. 14, the AGC amplifier is made such that portions of input/output lights to/from an optical amplifier (EDFA) 200 (300) are dropped by optical dropping means 501 and 502, respectively, and the respective powers [that is, input/output optical powers to/from the optical amplifier 200 (300)] are monitored by PDs 601 and 602, respectively, so that the excitation optical power to the EDFA 200 (300) is controlled by an automatic gain control unit 700 so as to make the power ratio constant.

Meanwhile, for example, as shown in FIG. 15(A), in such a system, let it be assumed that a large number of optical signals (for example, 39 wavelengths) are added from a given node 100 (100A) and one different one-wavelength optical signal is added from the next node 100 (100B). In this situation, for example, as shown in FIG. 15(B), in a case in which a trouble such as dynamic re-construction of an optical transmission path, man-made mistake, fiber disconnection or connector fall-out has occurred between the nodes 100A and 100B, only the signal light added at the node 100B remains (that is, the number of transmission wavelengths varies abruptly).

In response to this abrupt variation of the number of transmission wavelengths, for example, as shown in FIG. 16(A), there occurs a phenomenon that the power level of the residual optical signal varies at a signal reception end.

In this case, for example, as shown in FIG. 22, the aforesaid "signal reception end" signifies an optical receiver 101 having an optical/electrical conversion (O/E) function to receive a dropped light for converting it into an electric signal, and this also applies to the following description. Moreover, a "signal transmission end" signifies an optical transmitter 102 having an electrical/optical conversion function (E/O) to transmit a transmission signal (electric signal) with an added light having a predetermined wavelength.

For example, as shown in FIG. 16(B), the aforesaid signal optical power fluctuation stems mainly from three factors: (1) spectral hole burning (SHB), (2) gain (wavelength) deviation and (3) stimulated Raman scattering (SRS) effect. Each of these factors will be described hereinbelow.

(1) SHB

The first factor "SHB" is a phenomenon occurring in an optical amplifier 200 (300) and shows a feature that the shorter wavelength side optical signal power falls. That is, for example, as shown in FIG. 17, when an optical signal with one wavelength (for example, 1538 nm) in the C band (1530 to 1565 nm) is amplified in the optical amplifier 200 (300), there occurs a phenomenon that the EDFA gain in the vicinity of this signal wavelength drops (which is referred to as main hole) and the EDFA gain in the vicinity of 1530 nm also falls (which is referred to as second hole).

In addition, in the C band, there is a characteristic that the main hole becomes deeper toward the shorter wavelength side (the gain falling degree increases), and the main hole and the second hole become deeper as the optical signal input power increases. This SHB is subjected to the averaging in a state where a multi-wavelength signal light is inputted thereto and the influence thereof is low, whereas the influence thereof increases as the number of inputted wavelengths decreases. For this reason, for example, as shown in the row (1) of FIG. 16(B) and as shown in FIG. 18(A), in a case in which only one-wavelength signal light remains because a trouble has occurred between the nodes 100A and 100B as mentioned above, there occurs a phenomenon that the gain of the optical amplifier 200 (300) further decreases in the case of the shorter wavelength side residual signal light, which causes a reduction ($-\Delta P$) of the output optical power.

(2) Gain Deviation

The second factor "gain (wavelength) deviation" is a phenomenon occurring in the optical amplifier 200 (300). That is, as mentioned above, the optical amplifier 200 (300) is designed to execute control (AGC) for maintaining a constant average gain of signal light and, when a wavelength producing a deviation remains, as shown in the row (2) of FIG. 16(B), with respect to the residual optical signal, the output optical power varies (in this case, $+\Delta P$).

(3) SRS Effect

The third factor "SRS effect" is a phenomenon occurring in the transmission lines 400. The Raman amplifier is an optical amplifier utilizing this SRS effect. For example, as shown in FIG. 19, the SRS of a common single mode fiber shows a feature that a gain peak appears on a lower frequency side shifted by approximately 13 THz from the excitation light wavelength (longer wavelength side by approximately 100 nm in a case in which the excitation light wavelength is in the vicinity of 1400 nm), and the optical signal amplification in an arbitrary wavelength band becomes feasible by the selection of an excitation light wavelength. However, as shown in FIG. 19, difficulty is still experienced in enabling the amplification of a pinpoint wavelength, and the amplification (gain) characteristic has some degree of spread with respect to wavelength and, hence, the amplification phenomenon occurs even in the vicinity of the excitation light wavelength.

That is, in a case in which a WDM optical signal is transmitted through the transmission lines 400, the shorter wavelength side signal optical power becomes the excitation optical power, which amplifies the longer wavelength side signal light. In consequence, as shown in FIG. 20, the phenomenon appears that the signal optical power increases toward the longer wavelength side. Accordingly, in a case in which only one-wavelength signal light remains due to the occurrence of a trouble between the nodes 100A and 100B as mentioned above, as shown in the row (3) of FIG. 16(B) and in FIG. 18(B), the longer wavelength side residual signal light encounters a larger difficulty to take the power from the shorter wavelength side, and a power (gain) reduction ($-\Delta P$) occurs.

Thus, if the number of wavelengths of a WDM signal light propagating through the transmission lines 400 varies largely, mainly, due to the three factors of the SHB, gain deviation and SRS, the output optical power of the residual signal light (residual channel) varies. In the OADM node 100, it is possible to place a function to adjust the levels of the signal lights with the respective wavelengths through the use of the feedback control, and this feedback control can cope with the fluctuation of the output optical power stemming from the aforesaid variation of the number of signal light wavelengths and the locations.

However, this respective-wavelengths handling feedback control usually takes a considerable long time from the variation of the number of wavelengths (time t0) up to the steady-state functioning (time t2) as shown in FIG. 16(A). That is, difficulty is actually encountered in suppressing even the transient fluctuation of the output optical power after the variation of the number of wavelengths as shown by the time t1 in FIG. 16(A).

In addition, with respect to such a transient fluctuation of the output optical level, although the fluctuation for each node 100 or for each transmission line 400 is not very large, the power fluctuation characteristics of one optical amplifier 102 and the transmission line 400 increases cumulatively in the case of the system in which similar optical amplifiers 102 carrying out the AGC and the transmission lines 400 are provided in a multi-stage fashion.

For example, as shown in FIG. 21(A), before the variation of the number of wavelengths, the reception level at a signal reception end (see the optical receiver 101 in FIG. 22) under each node 100 is in a normal range (reception tolerable range) even if the number of spans increases. That is, as mentioned above with reference to FIG. 15(A), in a case in which 39 waves are added at the node 100A while 1 wave is added at the node 100B and light having 40 waves in total from the nodes 100A and 100B is received at a signal reception end, in the case of a normal state where a trouble shown in FIG. 15(B) does not occur, even if a signal reception end is provided under any one of the nodes existing between the spans #1 to #5 in FIG. 15(A), the received optical power fluctuation is not accumulated at the signal reception end, so stable light reception becomes feasible.

However, when a variation in the number of wavelengths occurs as shown in FIG. 15(B), as shown in FIG. 21(B), the optical power fluctuation ($\Delta P$) per channel which occurs in the respective optical amplifiers 200 and 300 and the transmission lines 400 increases cumulatively due to an increase in the number of spans, i.e., an increase in the number of passing optical amplifiers in a multi-stage fashion. That is, the received optical power fluctuation due to the influence of the variation of the number of wavelengths increases between the nodes 100A and 100B as a signal reception end is provided under the node 100 at a place where the number of passing spans #1 to #5 increases. The example in FIG. 21(B) shows that the negative-side reception power fluctuation increases due to an increase in number of spans.

In the case of a conventional optical transmission system which provides a short transmission distance and which has a small number of stages of the optical amplifiers, this fluctuation is minute and does not create a problem. However, in the future, along with a further increase in the number of stages of optical amplifiers for the long-distance transmission of the system, as shown in FIG. 21(B), there is a possibility that one of the optical signal powers of the respective wavelengths (channels) at the signal reception end or a plurality of optical signal powers are out of a reception tolerable range, which creates a transmission error. In other words, in a wavelength multiplex optical transmission system which performs a repeating transmission through a plurality of nodes 100 each having an OADM function, there is a possibility that the occurrence of a trouble in one transmission line zone can affect the communication in another transmission line zone.

Accordingly, considering the future development of a further lengthening of transmission distance, there is a need for realizing stable optical reception irrespective of the aforesaid occurrence of the optical power fluctuation.

As techniques related to the invention of the present application, for example, there are the techniques disclosed in the following Patent Documents 1 to 3.

The Patent Document 1 discloses an optical wavelength demultiplexer having a function to detect a level of an optical signal demultiplexed according to wavelength and further to attenuate the optical signal level of the corresponding wavelength as the detected optical signal level is higher.

Moreover, the Patent Document 2 discloses a technique of reducing the degradation of the SRS through the use of an amplifier for amplifying WDM channels simultaneously and a WDM shaping means.

Still moreover, the Patent Document 3 discloses a technique of suppression-controlling the transient fluctuation of the signal light level due to the SRS or SHB in a transmission apparatus at a repeating stage.

[Patent Document 1] Japanese Patent Laid-Open No. 2003-198478

[Patent Document 2] Japanese Patent Laid-Open No. HEI 9-8730

[Patent Document 3] Japanese Patent Laid-Open No. 2006-295113

However, each of the above-mentioned Patent Documents 1 to 3 does not disclose a configuration for carrying out the optical reception in an error-free condition even if received optical level fluctuation factors due to the above-mentioned variation of the number of wavelengths appear in transmission lines.

SUMMARY OF THE INVENTION

It is therefore one object of the present invention to enable the signal light reception to be made normally with a simple configuration irrespective of the occurrence of a variation of the number of wavelengths.

Combined with the above-mentioned object, additional object of the present invention is to provide the effects derivable from the respective configurations described in the following best mode for carrying out the invention and further provide the effects unattainable from conventional techniques.

(1) For these purposes, in accordance with one aspect of an embodiment, there is provided an optical receiving apparatus, which is for use in a wavelength multiplex optical transmission system and which receives light demultiplexed according to wavelength, comprising an optical level adjusting unit for adjusting a level of light inputted and outputting the level-adjusted light and a light receiving unit for receiving the light outputted from the optical level adjusting unit, with an optical level adjusted quantity in the optical level adjusting unit being set so that the level of light of relatively shorter wavelength band becomes lower than the level of light of relatively longer wavelength band.

(2) Furthermore, there is provided an optical level adjusted quantity setting method, comprising: acquiring information on a wavelength of light received; and setting an optical level adjusted quantity in an optical level adjusting unit for receiving light demultiplexed according to wavelength and for adjusting a level of the inputted light and outputting the level-adjusted light to a light receiving unit, on the basis of the acquired information so that a level of light to be outputted to the light receiving unit becomes relatively lower when a received wavelength exists within a shorter-wavelength band than when existing within a longer-wavelength band.

Thus, according to one aspect of an embodiment, the optical level adjusting unit is capable of, according to a received wavelength, relatively decreasing the level of light to be outputted to the light receiving unit in a shorter-wavelength band than in a longer-wavelength band, which enables the power of light to be inputted to the light receiving unit to fall within an optical reception tolerable range even if a variation in the number of wavelengths occurs and which achieves the normal and stable signal light reception.

BRIEF DESCRIPTION OF THE DRAWINGS

FIG. 3 is an illustration useful for explaining a power fluctuation characteristic according to a wavelength condition;

FIGS. 16(A) and 16(B) are illustrations for explaining an output optical power fluctuation at the occurrence of a variation in the number of wavelengths stemming from the occurrence of a trouble in the system shown in FIG. 13;

DESCRIPTION OF THE PREFERRED EMBODIMENTS

Embodiments of the present invention will be described hereinbelow with reference to the drawings.

The present invention is not limited to the following embodiments. In addition to the above-mentioned object of the present invention, other technical objects, means for achieving these technical objects and advantages/effects thereof will become more readily apparent from the following detailed description of the preferred embodiments.

[A] Description of First Embodiment

Figure 1:
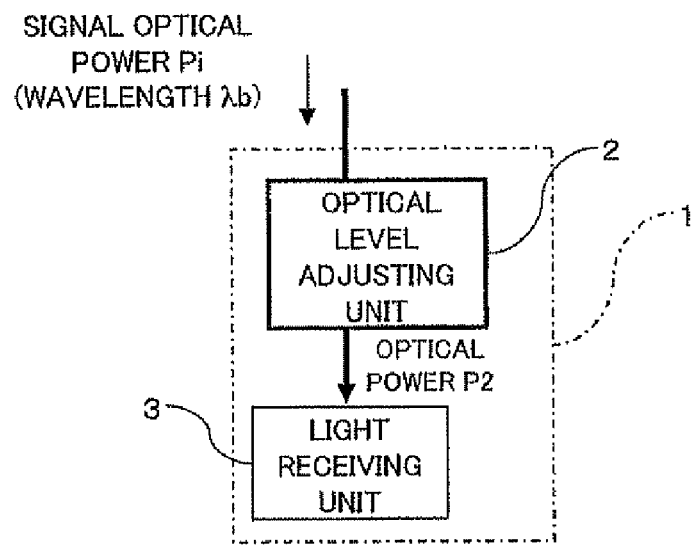
FIG. 1 is an illustration of an optical receiving apparatus according to a first embodiment of the present invention.
Figure 13:
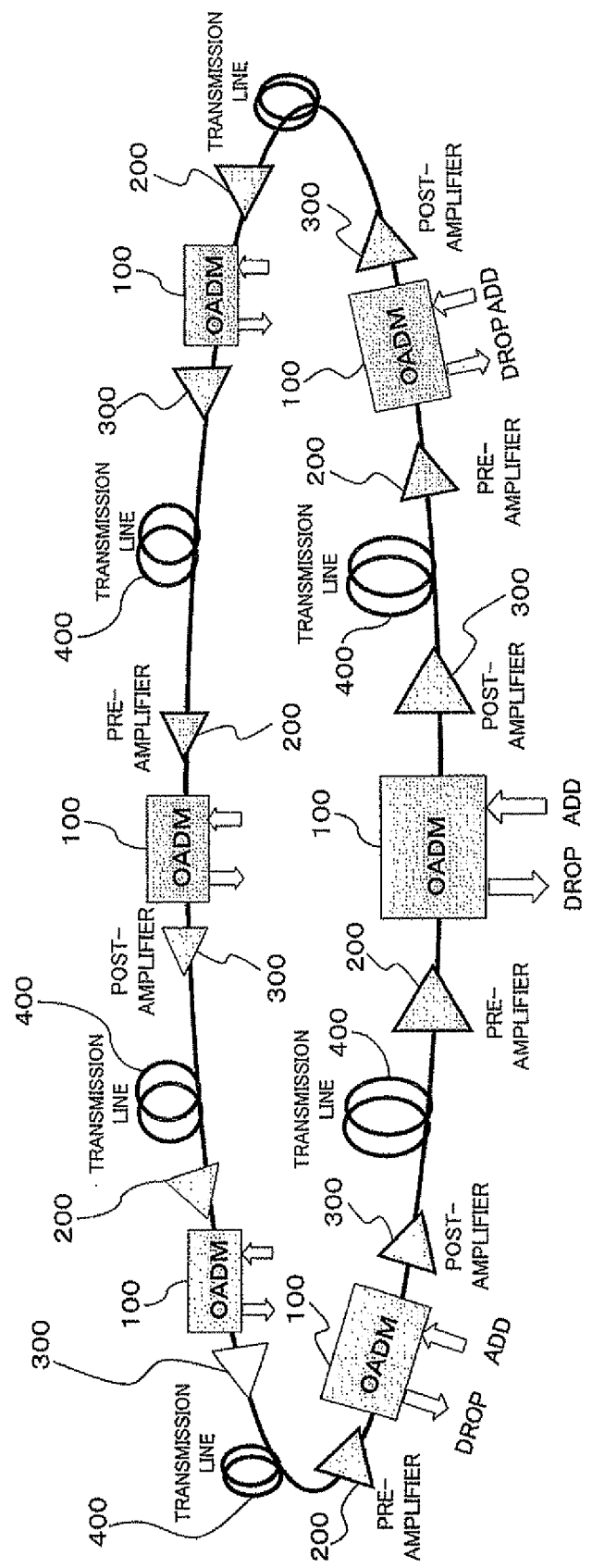
FIG. 13 is a block diagram showing an example of a configuration of a metrocore system.
Figure 14:
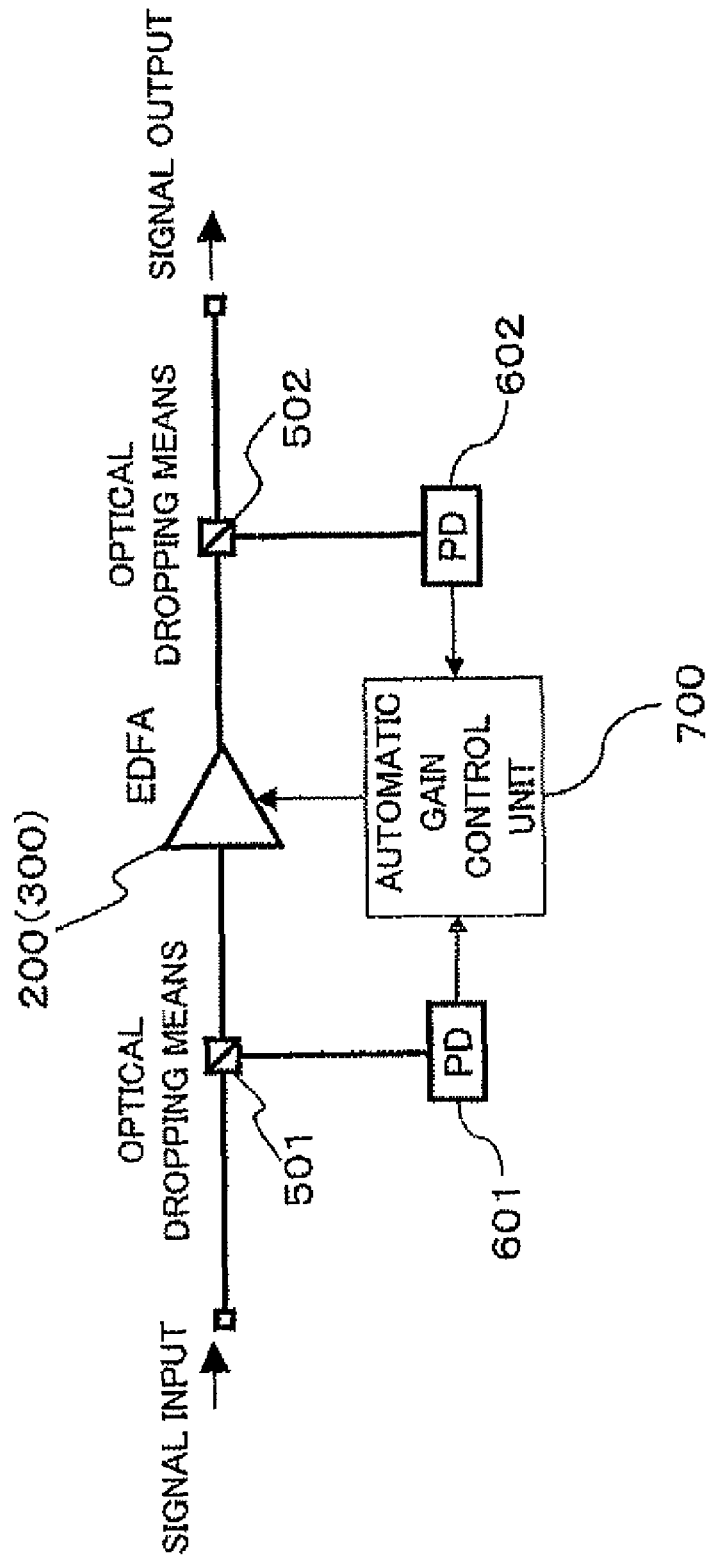
FIG. 14 is a block diagram showing a conventional example of a configuration of an AGC amplifier.
Figures 15A, 15B:
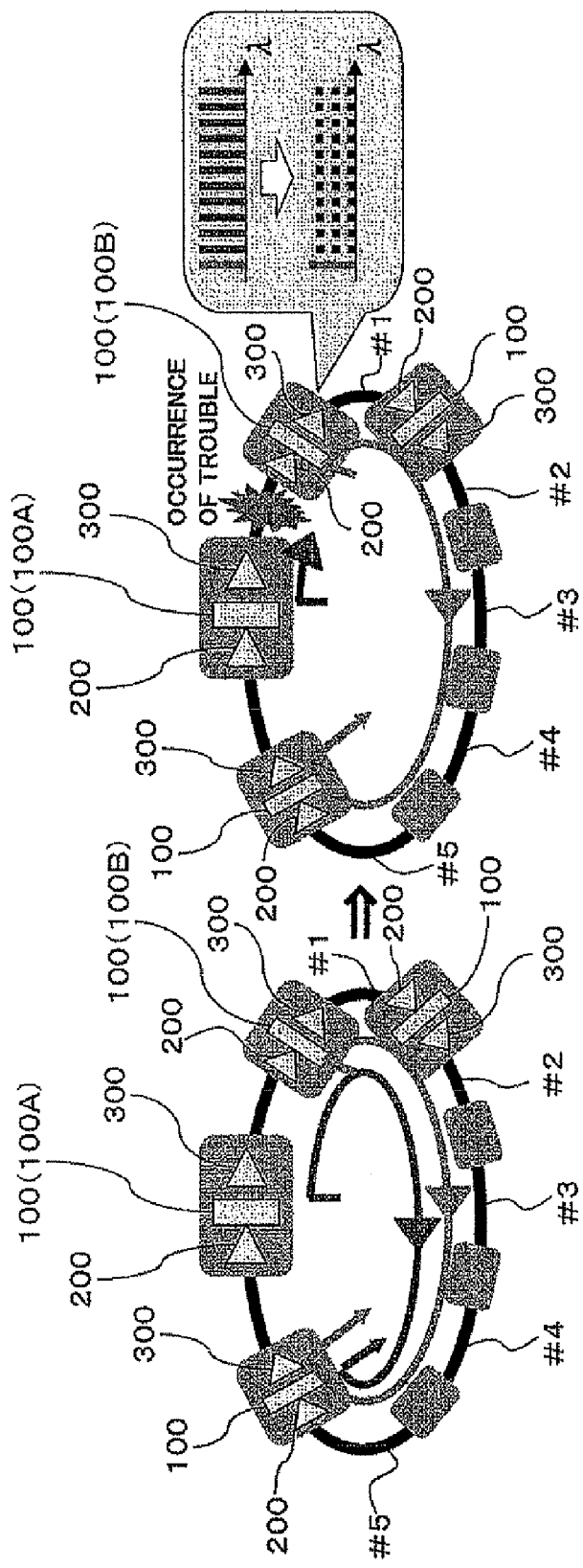
FIGS. 15(A) and 15(B) are illustrations for explaining an operation at the occurrence of a trouble in the system shown in FIG. 13.
Figure 17:
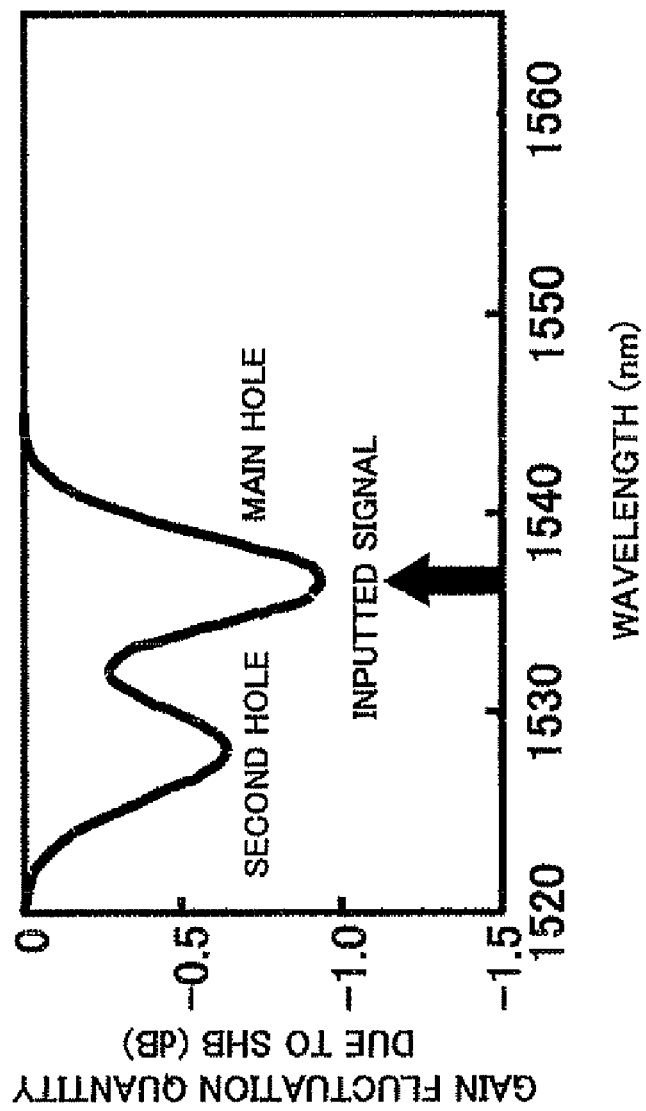
FIG. 17 is an illustration of one example of wavelength-dependent gain variation due to SHB.
Figure 18B:
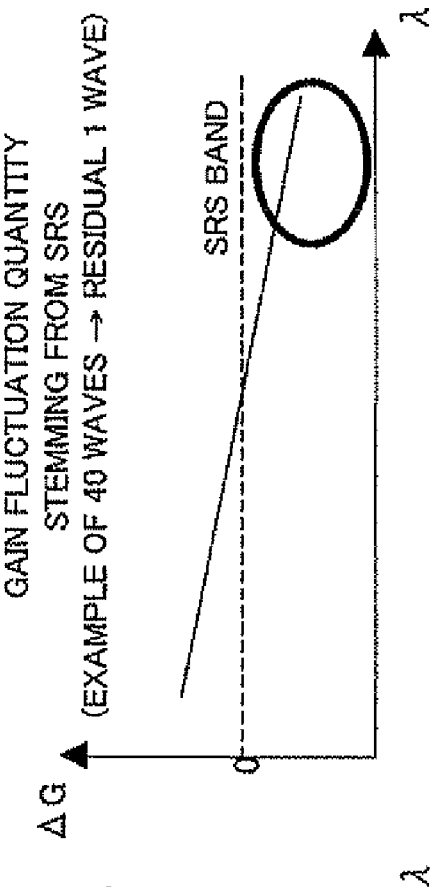
FIG. 18(B) is an illustration of one example of gain variation due to SRS with respect to wavelengths.
Figure 18A:
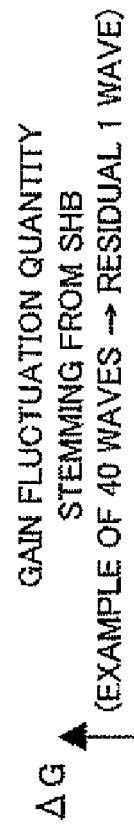
FIG. 18(A) is an illustration of one example of gain variation due to SHB with respect to wavelengths.
Figure 19:
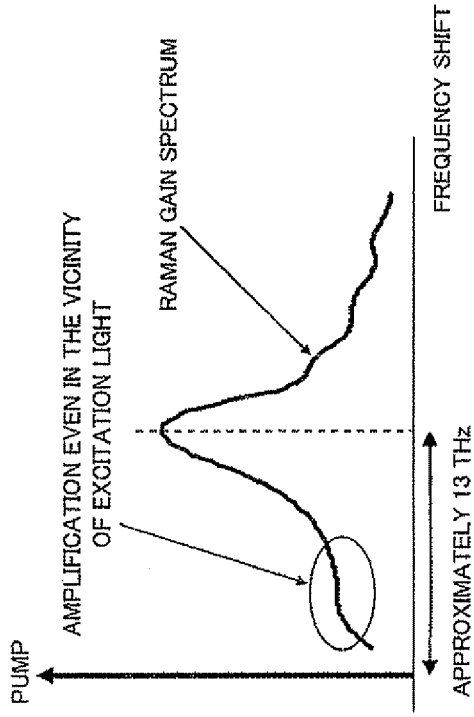
FIG. 19 is an illustration of one example of a Raman amplification band.
Figure 20:
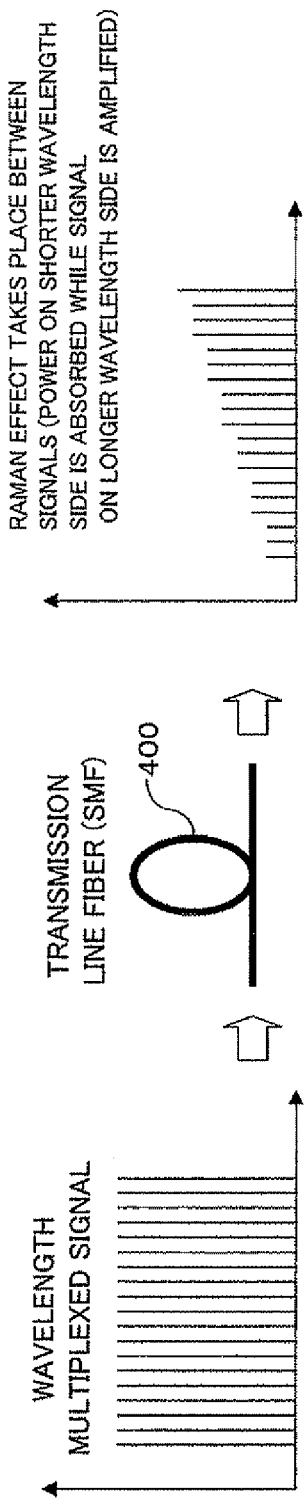
FIG. 20 is an illustration for explaining a Raman effect among signal wavelengths.
Figure 21A:
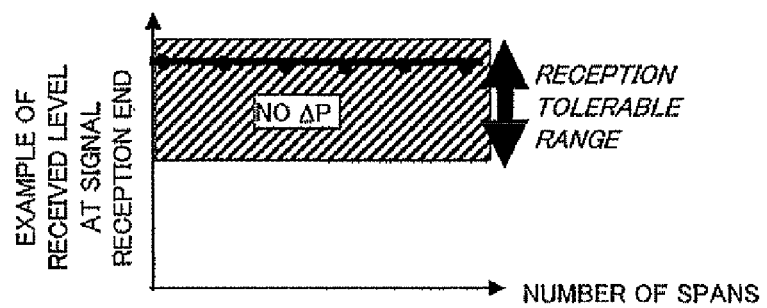
FIGS. 21(A) and 21(B) are illustrations for explaining problems of conventional techniques.
Figure 21B:
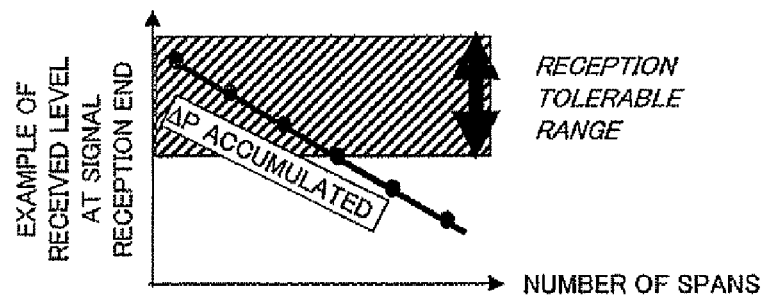
Figure 22:
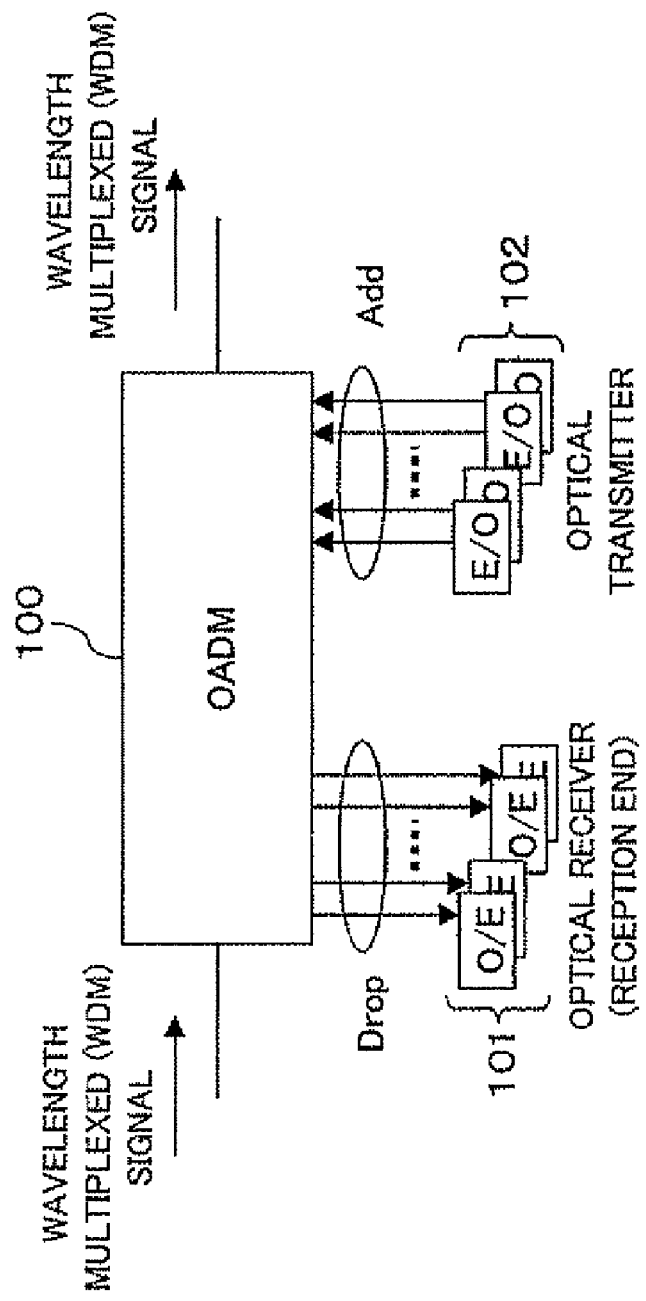
FIG. 22 is a block diagram for explaining a signal reception end.

FIG. 1 is an illustration of an optical receiving apparatus 1 according to a first embodiment of the present invention. This optical receiving apparatus 1 shown in FIG. 1 is for receiving light wavelength-demultiplexed by an OADM node (optical add/drop node) 100, for example, in a wavelength multiplex optical transmission system serving as a metrocore system similar to the above-mentioned system shown in FIG. 13. For example, like the aforesaid optical receiver 101 shown in FIG. 22 and serving as a signal reception end, it is designed to receive an optical signal dropped at the OADM node 100 in units of wavelengths. In other words, the optical receiving apparatus 1 according to the first embodiment can be configured as the optical receiver 101 shown in FIG. 22.

Figure 2:
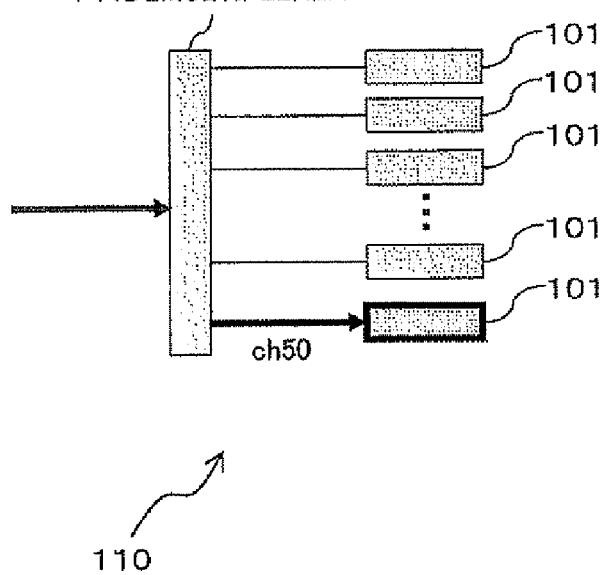
FIG. 2 is an illustration of an example of a configuration of a receiving node to which the optical receiving apparatus according to the first embodiment of the present invention is applicable.

In the OADM node 100, in a case in which optical signals in units of wavelengths, dropped by an OADM function thereof, are wavelength-multiplexed and sent through a single optical fiber transmission line, a receiving node 110 shown in FIG. 2 is capable of receiving the dropped light wavelength-multiplexed. The receiving node 110 is composed of a demultiplexer 11 having a demultiplexing resolution corresponding to the number of transmittable wavelength channels and the optical receiver 101 to which the configuration of the optical receiving apparatus 1 according to the first embodiment is applicable as a signal reception end. Incidentally, although the number of optical receivers 101 usable in the receiving node 110 shown in FIG. 2 corresponds to the number of transmittable wavelength channels, it is acceptable if the number of optical receivers 101 provided therein is equal to the number of wavelengths employed as drop wavelengths.

In this configuration, as shown in FIG. 1, the optical receiving apparatus 1 according to the first embodiment is composed of an optical level adjusting unit 2 for adjusting the level of input light before outputting and a light receiving unit 3 for receiving the light outputted from the optical level adjusting unit 2. The optical level adjusted quantity in the optical level adjusting unit 2 is set so that, according to the wavelength (received wavelength) received by the optical receiving apparatus 1, the level of the light to be outputted to the light receiving unit 3 becomes relatively lower in a shorter-wavelength band than in a longer-wavelength band.

That is, the optical level adjusting unit 2 adjusts the inputted optical level so as to acquire the wavelength of light to be received by this optical receiving apparatus 1, i.e., the output level corresponding to the wavelength of light to be inputted. For example, in a case in which the optical receiver 101 (see FIG. 22 or 2) is set to receive a shorter-wavelength signal light (wavelength$\lambda$a), the optical level adjusting unit 2 carries out the adjustment so that the output optical level reaches an optical power P1 which lies within a reception tolerable range in the light receiving unit 3. On the other hand, in a case in which the optical receiver 101 is set to receive a longer-wavelength signal light [wavelength $\lambda$b ($>\lambda$a)], the optical level adjusting unit 2 carries out the adjustment so that the output optical level becomes an optical power P2 which is higher than the optical power P1 and which still lies within the reception tolerable range in the light receiving unit 3.

For example, in a case in which the C (Conventional) band is employed as the transmission wavelength band and the optical receiving apparatus 1 is made as an optical receiver 101 designed to receive drop light having a received wavelength of $\lambda$a=1530 nm, the optical level adjusting unit 2 makes an adjustment so that, with respect to the power of drop light inputted, the optical level P1 to be outputted to the light receiving unit 3 becomes, for example, −15 dBm. On the other hand, when the optical receiving apparatus 1 is configured as an optical receiver 101 designed to receive drop light having a received wavelength of $\lambda$b=1560 nm, the optical level adjusting unit 2 makes an adjustment so that, with respect to the power of drop light inputted, the optical level P2 to be outputted to the light receiving unit 3 becomes, for example, −10 dBm (>P1).

In this connection, in a case in which the power of light to be inputted to the optical level adjusting unit 2 is well known, the optical level adjusting unit 2 can be made as a loss medium with a fixed loss quantity so as to acquire an output power corresponding to a received wavelength predetermined in the optical receiving apparatus 1, or it can be made as an attenuator with a fixed attenuated quantity or as an optical amplifier with a fixed gain with respect to an inputted wavelength.

In the optical receiving apparatus 1 thus configured, even in a case in which the gain in the above-mentioned transmission lines 400 (see FIG. 13) or the optical amplifiers 200, 300 varies transiently with respect to the drop light wavelengths due to a variation in the number of wavelengths, the light receiving unit 3 can receive light normally within an optical reception tolerable range owing to the optical level adjustment, which enables the suppression of the occurrence of an transmission error.

Meanwhile, as mentioned above, the suppression of the occurrence of the transmission error is feasible in a manner such that, according to the wavelength (received wavelength) to be received by the optical receiving apparatus 1, the optical level adjusted quantity in the optical level adjusting unit 2 is set so that the level of the light to be outputted to the light receiving unit 3 becomes lower relatively in a shorter-wavelength band than in a longer-wavelength band (or as the received wavelength becomes further shorter). This will be described below according to modes on variation in the number of wavelengths which trigger the above-mentioned gain fluctuations.

In this case, as the modes of the variation in the number of wavelengths, it is possible to consider a case in which the remaining wavelength after the variation in the number of wavelengths is wavelength on a shorter-wavelength side, a case in which the remaining wavelength is a wavelength in a central wavelength band, a case in which the remaining wavelength is a wavelength on a longer-wavelength side, a case in which the remaining wavelength is separately distributed to a shorter-wavelength side and a longer-wavelength side, and other cases. In a case in which the remaining wavelength is a shorter-wavelength side wavelength, for example, when one shorter wavelength remains in a state where all the wavelengths in a transmittable wavelength band are in transmission, as indicated by a wavelength condition #1 in FIG. 3, the light with the relevant wavelength becomes susceptible to the gain fluctuation stemming from the SRS and the SHB, and the power fluctuation thereof relatively increases in the plus side direction.

Figures 4A, 4B:
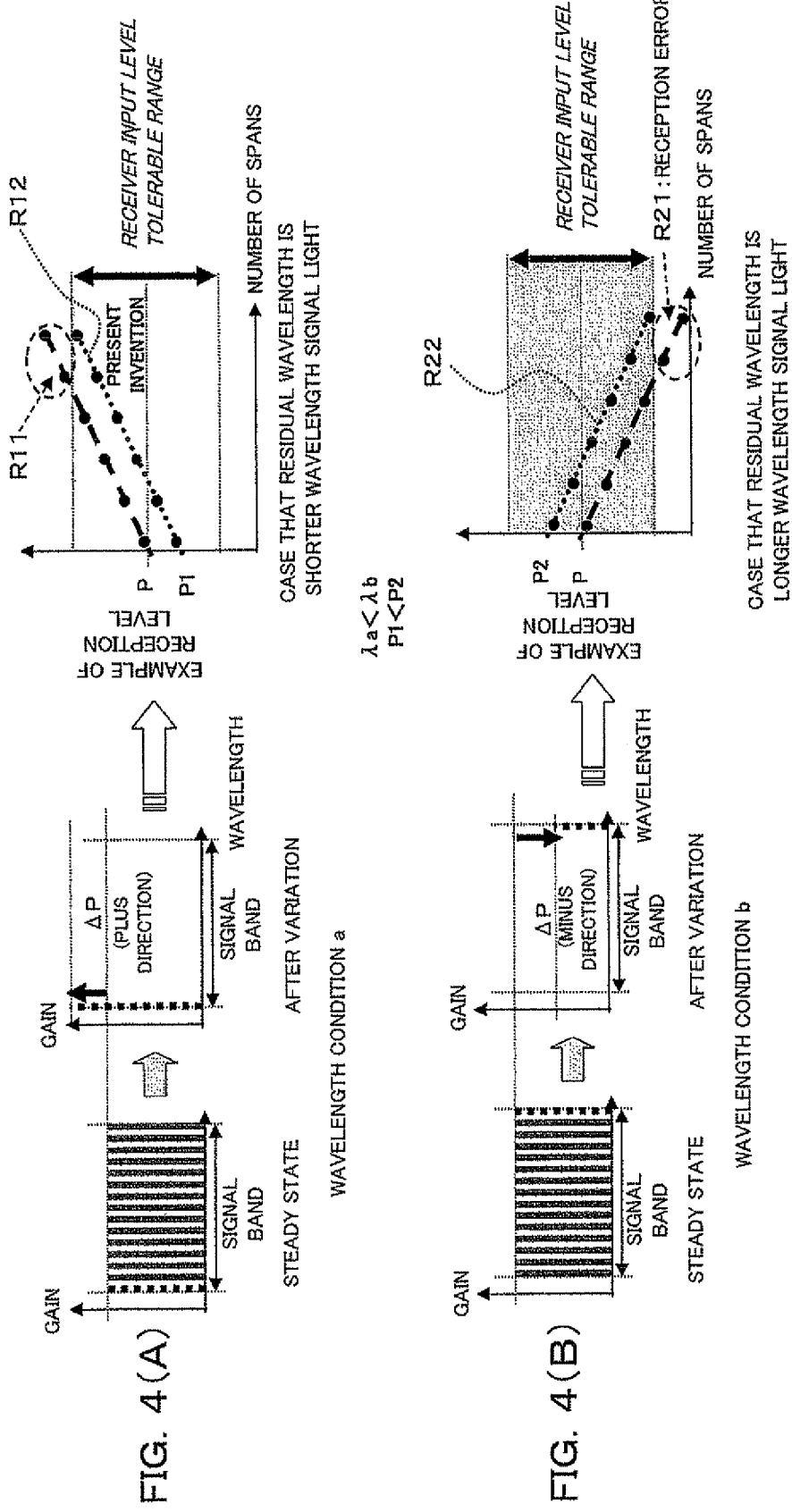
FIGS. 4(A) and 4(B) are illustrations useful for explaining the advantages/effects of the first embodiment.

In this case, as indicated by a left-side wavelength condition (a) in FIG. 4(A), when a wavelength on a shorter-wavelength side remains due to the variation in the number of wavelengths in the case of the transmission of lights with all the wavelengths, the gain of the light with this shorter-wavelength side wavelength increases due to the SRS and the SHB, and the optical level fluctuates in the plus direction. Accordingly, as shown on the right side of FIG. 4(A), in the optical receiver 101 under a node apparatus located in a downstream side transmission line existing at a place where such a variation in the number of wavelengths has occurred, the optical level increases along with an increase in the of passing spans and, depending on the number of passing spans, the optical level goes beyond the reception tolerable range of the light receiving unit 3 (see R11), which interferes with the enhancement of the durability of the light receiving unit 3.

On the other hand, in a case in which the remaining wavelength is a wavelength on a longer-wavelength side, for example, one longer wavelength remains when all the wavelengths in a transmittable wavelength band width are in transmission, as indicated by a wavelength condition #3 in FIG. 3, the light with this shorter wavelength becomes susceptible to the gain fluctuation due to the SRS, and the power fluctuation thereof relatively increases in the minus side direction.

In this case, as indicated by a wavelength condition (b) on the left side of FIG. 4(B), when a longer-wavelength side wavelength remains due to a variation in the number of wavelengths with the lights with all the wavelengths being in transmission, the gain of the light with this longer-wavelength side wavelength increases by receiving the influence of the SRS dominantly, and the optical level fluctuates in the minus side direction. Accordingly, as shown in the right side of FIG. 4(B), in the optical receiver 101 under a node apparatus located in a downstream side transmission line existing at a place where such a variation in the number of wavelengths has occurred, the optical level decreases along with an increase in the number of passing spans and, depending on the number of passing spans, the optical level falls below the reception tolerable range (see R21), which interferes with the improvement of the quality of the received signal.

In a case in which the remaining wavelength is a wavelength in a central wavelength band and in a case in which the remaining wavelength is distributed separately to a shorter wavelength side and a longer wavelength side, as indicated by wavelength conditions #2 and #4 in FIG. 3, the gain fluctuation decreases relatively.

Thus, in a wavelength variation mode in which the optical power of the remaining wavelength becomes higher, the remaining wavelength is a wavelength on a shorter wavelength side while, in a wavelength variation mode in which the optical power of the remaining wavelength becomes lower, the remaining wavelength is a wavelength on a longer wavelength side. That is, in the optical receiver 101, in the case of the reception of light with a wavelength on a shorter wavelength side, there is a relatively large reason to consider the fact that the power of light inputted to the light receiving unit 3 goes beyond an optical reception tolerable range when a variation in the number of wavelengths occurs. On the other hand, in the case of the reception of light with a wavelength on a longer wavelength side, there is a relatively large need to consider the fact that the power of light inputted to the light receiving unit 3 falls below the reception tolerable range when a variation in the number of wavelengths occurs. Incidentally, in the case of the stay of light in a central wavelength band and in the case of the stay of a shorter wavelength and a longer wavelength in a distributed state, since the optical level fluctuation is relatively small, even if the number of passing spans increases, there is a relatively low need to consider that the optical level becomes out of the reception tolerable range.

Figure 5B:
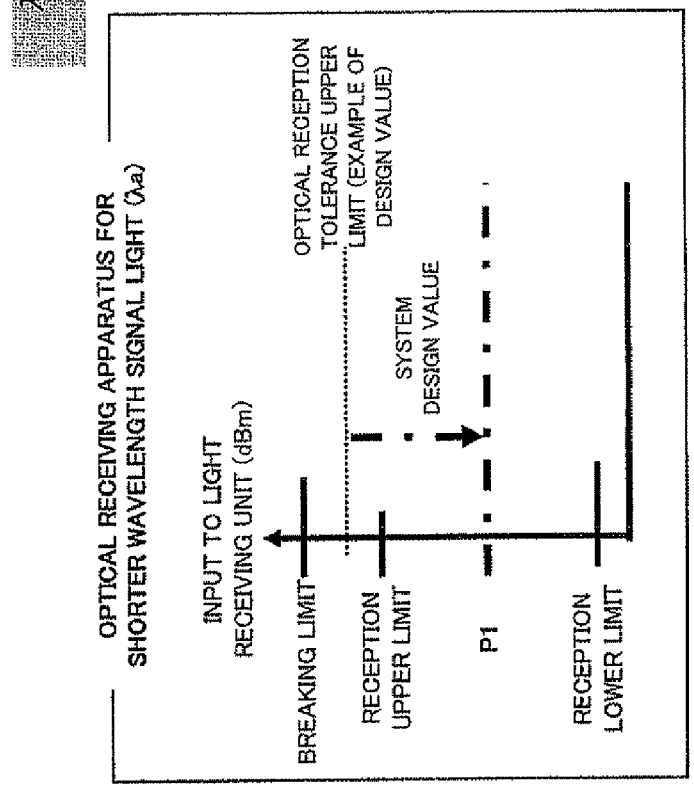
FIGS. 5(A) and 5(B) are illustrations useful for explaining functions of an optical level adjusting unit according to the first embodiment.
Figure 5A:
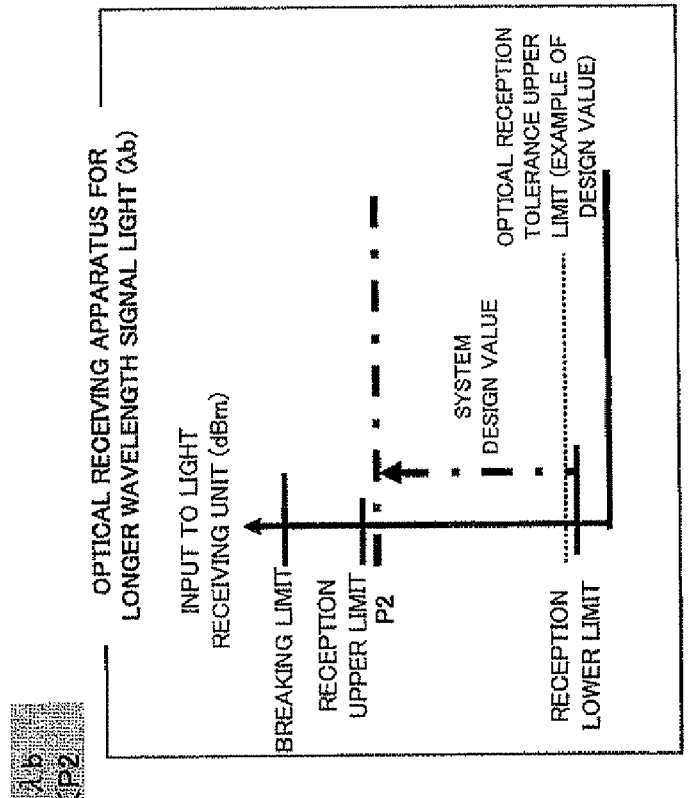

For this reason, in the optical receiving apparatus 1 according to the first embodiment, for example, as shown in FIG. 5(A), in the case of the reception of light with a wavelength λa on a shorter wavelength side, the optical level adjusting unit 2 carries out the adjustment so that the output power becomes P1 (<P2), which enables the power of light to be inputted to the light receiving unit 3 is put in the reception tolerable range even if a variation in the number of wavelengths occurs. That is, in the optical receiving apparatus 1 which receives a short-wavelength signal light λa, as shown in FIG. 5(A), the output power in the optical level adjusting unit 2 is set to be the level P1 lower by a predetermined level ("system design value") than a reception tolerable upper limit in the light receiving unit 3, thereby placing it below the reception tolerable upper limit in the light receiving unit 3 even if the gain increases due to a variation in the number of transmission wavelengths. In other words, even if there occurs that the optical power variations are accumulated due to an increase in the number of passing spans, the optical level can fall within the reception tolerable range in the light receiving unit 3 of the optical receiving apparatus 1 (see R12 in FIG. 4(A)).

Likewise, as shown in FIG. 5(B), in the optical receiving apparatus 1 which receives light with a wavelength λb on a longer wavelength side, the optical level adjusting unit 2 adjusts the output power to P2 (<P1) so that the optical power to be inputted to the light receiving unit 3 can be put within the reception tolerable range even if a variation in the number of wavelengths occurs. That is, in the optical receiving apparatus 1 made to receive light with a wavelength λb on a longer wavelength side, as shown in FIG. 5(B), the output power in the optical level adjusting unit 2 is set at a level P2 (>P1) higher by a predetermined level ("system design value") than the reception tolerable lower limit in the light receiving unit 3 so that the optical power is placed above the reception tolerable lower limit even if the gain decreases due to the occurrence of a variation in the number of transmission wavelengths. In other words, even if there occurs that the optical power variations are accumulated due to an increase in the number of passing spans, the optical level can fall within the reception tolerable range in the light receiving unit 3 of the optical receiving apparatus 1 (see R22 in FIG. 4(B)).

Thus, even in the optical receiving apparatus 1 which receives any one of wavelengths within a transmission wavelength band, the optical power to be inputted to the light receiving unit 3 can be placed within the optical reception tolerable range even if a variation in the number of wavelengths of light propagating through transmission lines occurs.

Each of the predetermined level to be taken at the determination of P1 set to be lower with respect to the optical reception upper limit of the light receiving unit 3 and the predetermined level to be taken at the determination of P2 set to be higher with respect to the optical reception lower limit of the light receiving unit 3 is previously estimated as a system design value on the basis of factors such as the system conditions, the types of transmission lines and the characteristics of optical amplifiers. The system conditions can include the number of transmission spans, a signal band, the number of transmission signal wavelengths, a transmission line input level and others. The types of transmission lines can include a transmission line effective cross section and others. Moreover, the optical amplifier characteristics can include a characteristic of a control circuit for controlling the gain of an optical amplifier, a characteristic of a gain wavelength deviation of an optical amplifier and an SHB characteristic.

As described above, according to the first embodiment of the present invention, the optical level adjusting unit 2 can carry out an operation so that, according to a received wavelength, the level of light to be outputted to the light receiving unit 3 becomes relatively lower in a shorter wavelength band than in a longer wavelength band, which can provide advantages of placing the power of light to be inputted to the light receiving unit 3 within an optical reception tolerable range even if a variation in the number of wavelengths occurs, thereby achieving normal signal light reception.

[B] Description of Second Embodiment

Figure 6:
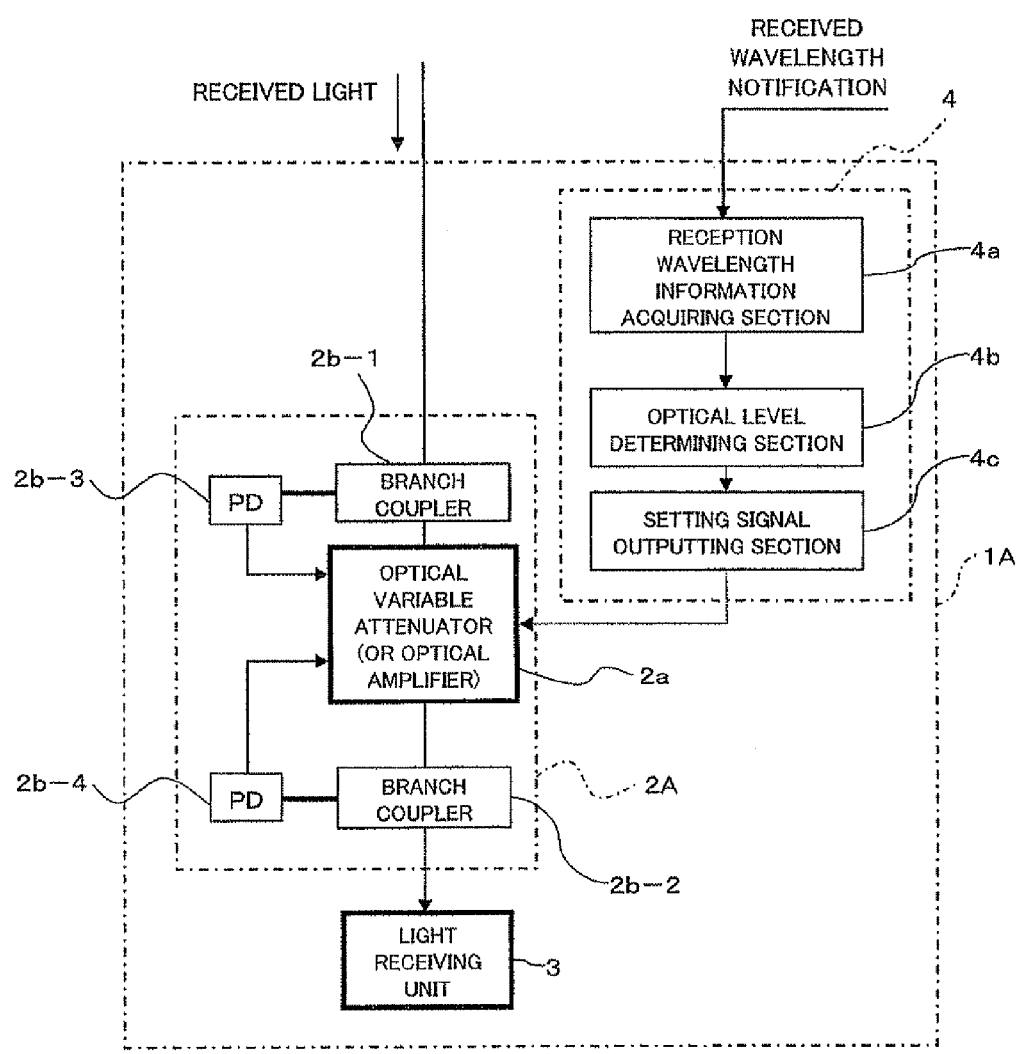
FIG. 6 is an illustration of an optical receiving apparatus according to a second embodiment of the present invention.

FIG. 6 is an illustration of an optical receiving apparatus 1A according to a second embodiment of the present invention. In FIG. 6, as well as the above-described apparatus (see the reference numeral 1) according to the first embodiment, the optical receiving apparatus 1A is also applicable to the optical receiver 101 shown in FIG. 2 or 22. However, the optical receiving apparatus 1A differs therefrom in a configuration of an optical level adjusting unit 2A and the installation of a setting control unit 4. A light receiving unit 3 is similar to that in the optical receiving apparatus 1 according to the first embodiment.

The setting control unit 4 is for setting and controlling the optical level adjusting unit 2A so that, according to a received wavelength, the optical level of the light to be outputted from the optical level adjusting unit 2A to the light receiving unit 3 becomes lower relatively in a short wavelength band than in a long wavelength band, and the setting control unit 4 is composed of a reception wavelength information acquiring section 4a, an optical level determining section 4b and a setting signal outputting section 4c. The reception wavelength information acquiring section 4a is for acquiring information on the wavelength of light to be received, on the basis of information notified from the external. For example, an OSC (Optical Supervisory Channel) monitor signal in a wavelength multiplex optical transmission system is inputted so as to extract and acquire received light wavelength information from this monitor signal.

Moreover, the optical level determining section 4b is for determining an optical level to be outputted from the optical level adjusting unit 2A to the light receiving unit 3, i.e., an output optical level from the optical level adjusting unit 2A, on the basis of the received light wavelength information acquired by the reception wavelength information acquiring section 4a. For example, this optical level determining section 4b is designed to determine an output optical level from the optical level adjusting unit 2A so that that, on the basis of the received light wavelength information acquired by the reception wavelength information acquiring section 4a, the level of the light to be outputted to the light receiving unit 3 becomes lower when the wavelength of the light to be received by this optical receiving apparatus 1A is within a first band which is a predetermined shorter wavelength band set in advance than when the wavelength of the light to be received thereby is within a second band which is a band existing on a longer wavelength side with respect to the first band.

Figure 8:
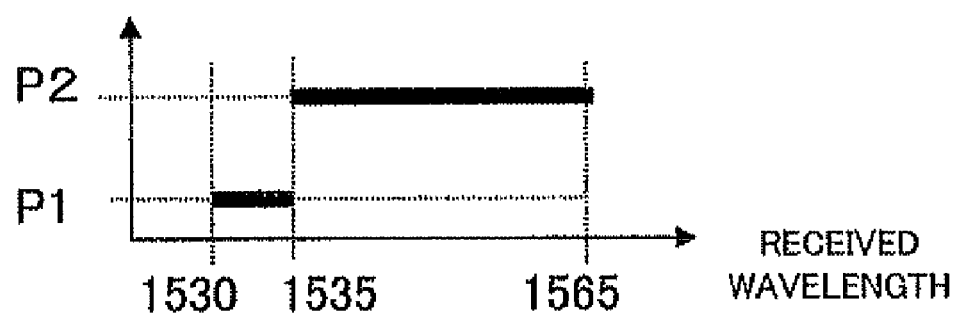
FIG. 8 is an illustration useful for explaining a function of an optical level adjusting unit of the optical receiving apparatus according to the second embodiment of the present invention.

In particular, in a case in which the wavelength band in a wavelength multiplex optical transmission system is set as the C band, the first band can be set to a range approximately from 1530 nm to 1535 nm constituting a shorter wavelength band of the C band, and the second band can be set to a range approximately from 1535 nm to 1560 nm constituting a longer wavelength band than the first band. In this case, for example, as shown in FIG. 8, with respect to light having a wavelength in the range approximately from 1535 nm to 1560 nm which constitute the second band, the optical level determining section 4b determines the output optical power from the optical level adjusting unit 2A at the optical power P2 while, with respect to light having a wavelength in the range approximately from 1530 nm to 1535 nm which constitute the first band, it sets the output optical power from the optical level adjusting unit 2A at the optical power P1 which is lower in optical level than that of light existing within the second band.

The above-mentioned optical level determining section 4b includes, for example, a storage unit for storing an output power of the optical level adjusting unit 2A which is to be set according to a received wavelength and a storage control function capable of fetching the contents in the storage unit. The storage control unit can also determine, as the output optical level of the optical level adjusting unit 2A, the output optical power fetched by referring to the contents in the storage unit on the basis of the received light wavelength information acquired (as a key) by the reception wavelength information acquiring section 4a.

Moreover, the setting signal outputting section 4c is for outputting, to the optical level adjusting unit 2A, a setting signal which is for setting an optical level, determined by the optical level determining section 4b, at a set level of light to be outputted to the light receiving unit 3. Thus, in response to the setting signal from the setting signal outputting section 4c, the optical level adjusting unit 2A sets an optical level adjusted quantity so that the level of the light to be light receiving unit 3 becomes relatively lower when a received wavelength is in a shorter wavelength band than when the received wavelength is in a longer wavelength band.

Furthermore, the optical level adjusting unit 2A includes an optical variable attenuator 2a for attenuating inputted light by an attenuated quantity set variably on the basis of a setting signal from the setting signal outputting section 4c constituting the above-mentioned setting control unit 4 and a monitoring section 2b for monitoring an inputted optical level and an outputted optical level to and from the optical variable attenuator 2a.

In the second embodiment, the monitoring section 2b has branch couplers 2b-1 and 2b-2 for making branches of portions of inputted and outputted lights to and from the optical variable attenuator 2a, respectively, and photodiodes (PDs) 2b-3 and 2b-4 for monitoring the powers of the branched lights from the branch couplers 2b-1 and 2b-2, respectively. Moreover, the results of monitoring of the respective optical powers by the photodiodes 2b-3 and 2b-4 are outputted to the optical variable attenuator 2a as the results of monitoring of the inputted and outputted optical levels to and from the optical variable attenuator 2a.

In addition, the optical variable attenuator 2a receives the monitor results on the respective optical powers from the photodiodes 2b-3 and 2b-4 and, on the basis of these monitor results, it attenuates the inputted light to a level which is to be set by the setting signal from the aforesaid setting signal outputting section 4c and outputs the light with the attenuated level to the light receiving unit 3. For this operation, the optical variable attenuator 2a has, for example, an attenuating element capable of attenuating the inputted light by a variably attenuated quantity and an attenuated quantity control function capable of controlling an attenuated quantity in the attenuating element. On the basis of the monitor results from the photodiodes 2b-3 and 2b-4, the attenuated quantity control function is capable of controlling the attenuated quantity in the attenuating element so that the power of light to be outputted through the branch coupler 2b-2 to the light receiving unit 3 becomes a target output level set by a setting signal from the setting signal outputting section 4c.

Aside from the operation in the monitoring section 2b according to the second embodiment, according to the present invention, there is no need to monitor both the inputted and outputted optical levels to and from the optical variable attenuator 2a, and even in the case of monitoring one of the inputted and outputted optical levels, it is also possible to execute the control of the output light from the optical variable attenuator 2a to the target output level on the basis of the monitored optical level.

In addition, although the optical level adjusting unit 2A according to the second embodiment is quipped with the optical variable attenuator 2a, it is also acceptable that this optical variable attenuator 2a is properly configured according to a configuration of an optical network, which is in connection with the optical receiving apparatus 1A, in place of an optical amplifier having a gain control function. In this case, an optical amplifier includes, for example, an amplification medium and a gain control function for the amplification medium. The gain control function is made to control the gain of the amplification medium on the basis of the monitor results from the photodiodes 2b-3 and 2b-4 so that the power of light to be outputted through the branch coupler 2b-2 to the light receiving unit 3 becomes a target output level set by a setting signal from the setting signal outputting section 4c.

Figure 7:
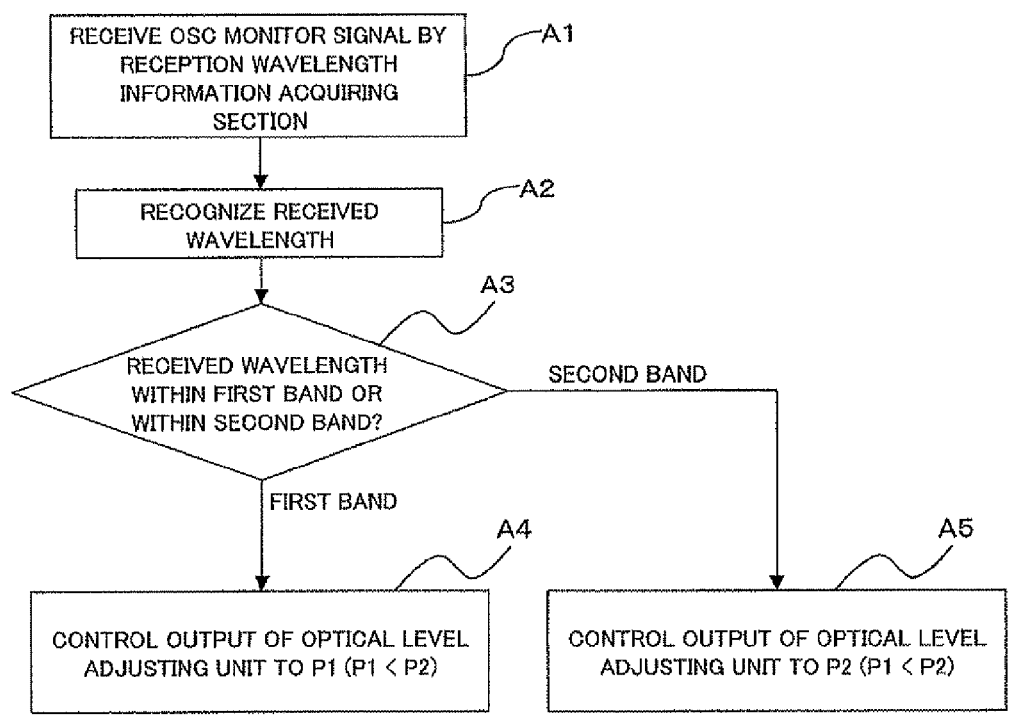
FIG. 7 is a flow chart useful for explaining an operation of the optical receiving apparatus according to a second embodiment of the present invention.

In the optical receiving apparatus 1A configured as described above, as shown in a flow chart of FIG. 7, the reception wavelength information acquiring section 4a constituting the setting control unit 4 receives, for example, an OSC monitor signal (step A1) and acquires the information on the wavelength of the light, this optical receiving apparatus 1A receives, from the monitor signal (step A2). Following this, the optical level determining section 4b determines an optical level adjusted quantity in the optical level adjusting unit 2A on the basis of the received wavelength information from the reception wavelength information acquiring section 4a so that the level of the light to be outputted to the light receiving unit 3 becomes lower relatively when the received wavelength is in a shorter wavelength band than when it is in a longer wavelength band (steps A3 to A5).

Concretely, in a case in which the C band (1530 nm to 1560 nm) is used as a transmission wavelength band, as shown in FIG. 8, when the received wavelength exists within a second band approximately from 1535 nm to 1560 nm, the output optical power from the optical level adjusting unit 2A (or the input optical power to the light receiving unit 3) is determined to be P2 (step A3 and advancing through a "second band" route to step A5). On the other hand, when the received wavelength exists within a first band approximately from 1530 nm to 1535 nm, the output optical power from the optical level adjusting unit 2A is determined to be P1 which is smaller than the value (P2) when it is within the second band (step A3 and advancing through a "first band" route to step A4).

Moreover, the setting signal outputting section 4c outputs, to the optical level adjusting unit 2A, a setting signal whereby the level of the light to be outputted from the optical level adjusting unit 2A becomes an optical level determined by the optical level determining section 4b. Thus, on the basis of the setting signal inputted from the setting signal outputting section 4c, the optical level adjusting unit 2A carries out the optical level adjustment so that the output optical level reaches the optical level determined by the optical level determining section 4b (steps A4 and A5).

In this case, since the optical level adjusting unit 2A is capable of conducting an operation so that the level of the light to be outputted to the light receiving unit 3 becomes lower when the received wavelength is in a shorter wavelength band than when it is in a longer wavelength band, as well as the above-described first embodiment, it is possible to place the power of the light to be inputted to the light receiving unit 3 within an optical reception tolerable range irrespective of the occurrence of a variation in the number of wavelengths.

In particular, according to the second embodiment, in a case in which the wavelength of the light to be inputted to the optical receiving apparatus 1A is not known, since a monitor signal in a wavelength multiplex optical communication system employed is inputted thereto and the information on the wavelength of the light to be inputted thereto is obtainable in advance on the basis of the monitor signal, when the input optical power to the light receiving unit 3 is previously set according to this optical wavelength, as well as the above-described first embodiment, the optical power to be inputted to the light receiving unit 3 can be placed within the optical reception tolerable range even if a variation occurs with respect to transmission optical wavelength other than the inputted light wavelength.

Thus, the second embodiment of the present invention can provide the advantages similar to those of the above-described first embodiment and, further, through the use of the setting control unit 4 and the optical level adjusting unit 2A, it can acquire the wavelength of light to be inputted and adjust the optical power to be inputted to the light receiving unit 3 on the basis of the information on the acquired light wavelength, which provides an advantage of adjusting the input optical power to the light receiving unit 3 to put it within the optical reception tolerable range even if attention is paid to optical power variation factors depending on the light wavelength.

Although in the second embodiment the reception wavelength information acquiring section 4a is made to extract the information on a received wavelength from an OSC monitor signal, according to the present invention, it is also appropriate that the received wavelength information is extracted from information received from a different system information transmission means.

In addition, although in the second embodiment the optical level determining section 4b determines one of two types of optical powers P1 and P2 according to whether the received wavelength is in a first band or in a second band, according to the present invention, it is also acceptable that the optical power is determined in a different mode provided that, at least, the optical level to be outputted to the light receiving unit 3 becomes relatively lower when the received wavelength is within a shorter wavelength band than when the received wavelength is within a longer wavelength band.

[C] Description of Third Embodiment

Figure 9:
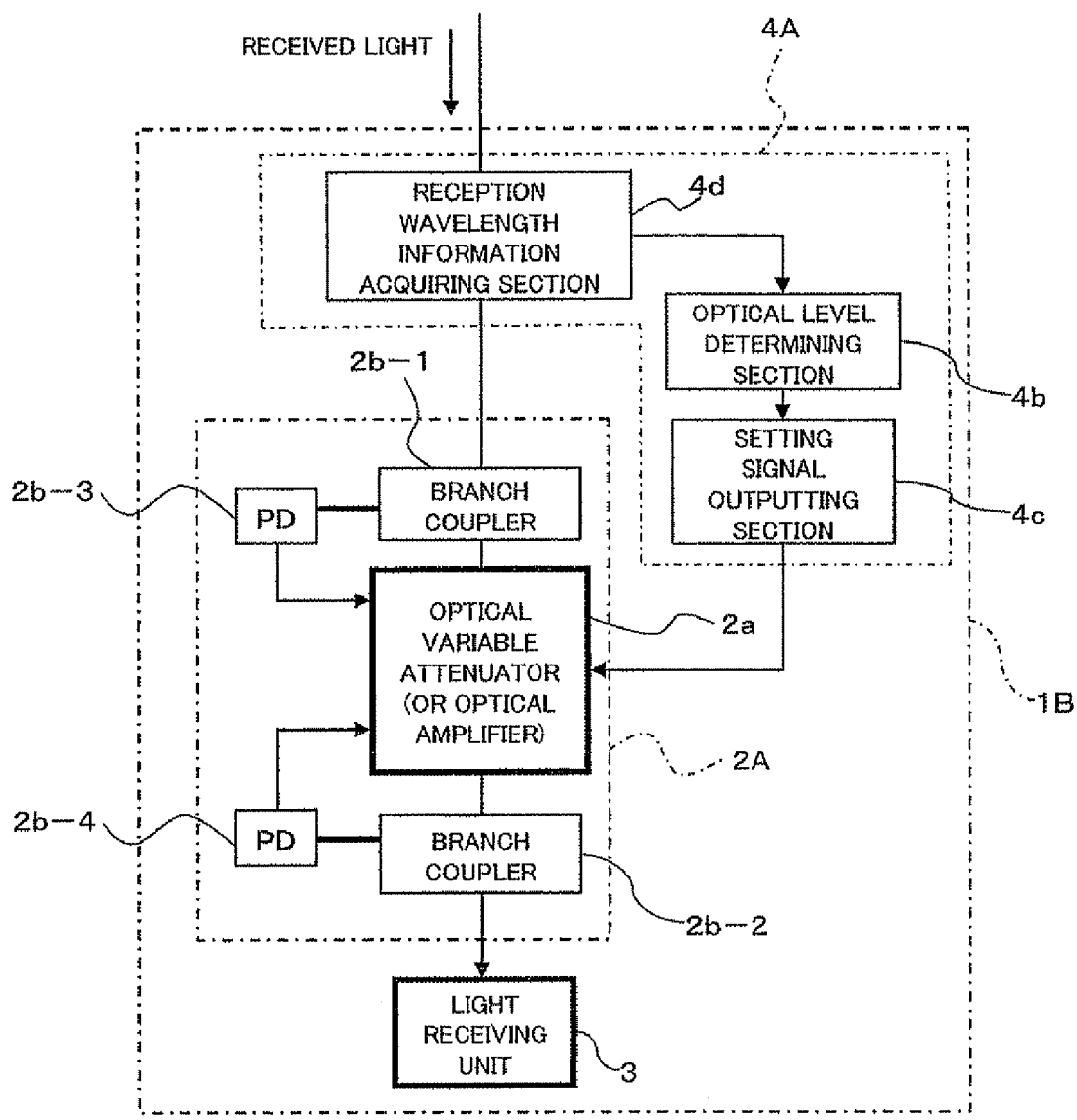
FIG. 9 is an illustration of an optical receiving apparatus according to a third embodiment of the present invention.

FIG. 9 is an illustration of an optical receiving apparatus 13 according to a third embodiment of the present invention. The optical receiving apparatus 1B shown in FIG. 9 differs in a configuration of a setting control unit 4A from that according to the above-described second embodiment (see reference numeral 1A), but the other configurations are basically the same as those of the optical receiving apparatus 1A according to the second embodiment. In FIG. 9, the same reference numerals as those used in FIG. 6 designate almost similar parts.

In this case, the setting control unit 4A is equipped with a reception wavelength information acquiring section 4d which is different from that in the setting control unit 4 according to the above-described second embodiment. That is, the reception wavelength information acquiring section 4d is configured as a wavelength detecting section adapted to detect a wavelength of light inputted to the optical level adjusting unit 2A and, for example, it can be configured with an optical spectrum analyzer or the like adapted to detect an optical wavelength of a portion of light inputted to the optical level adjusting unit 2A. In addition, it is also acceptable to prepare a configuration designed to detect a wavelength of light inputted to the optical level adjusting unit 2A through the use of a technique disclosed in, for example, a document (International Publication 2004/068093, pamphlet).

Thus, in a mode similar to the case according to the above-described second embodiment, the optical level determining section 4b is made to determine an output optical level of the optical level adjusting unit 2A on the basis of information on a wavelength of light inputted to the optical level adjusting unit 2A, which is detected by the reception wavelength information acquiring section 4d. Moreover, the setting signal outputting section 4c outputs a setting signal to the optical level adjusting unit 2A for obtaining the determined output optical level.

Figure 10:
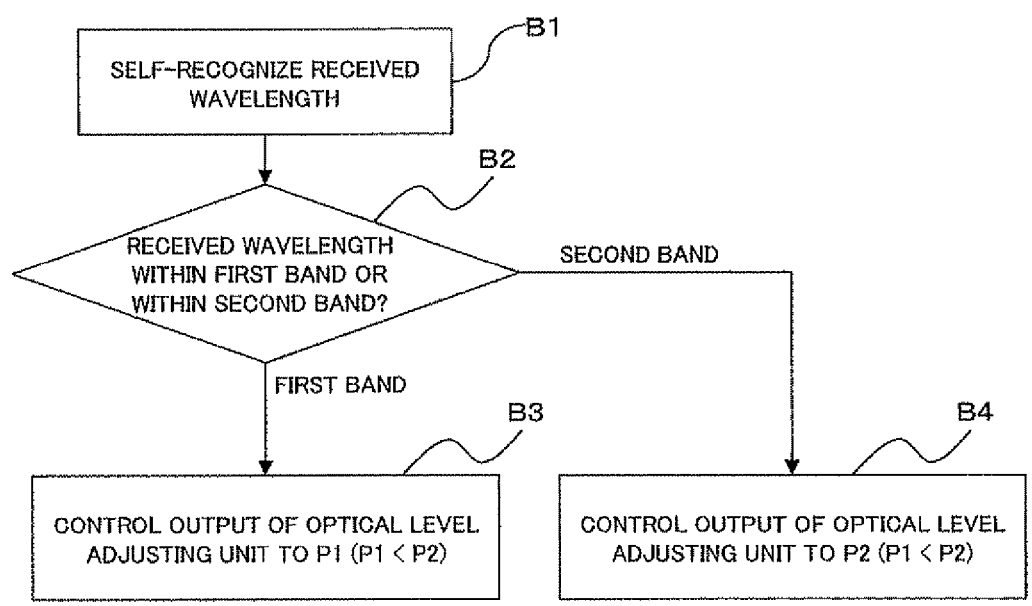
FIG. 10 is a flow chart useful for explaining an operation of the optical receiving apparatus according to the third embodiment of the present invention.

In the optical receiving apparatus 1B configured as described above, as shown in a flow chart of FIG. 10, the reception wavelength information acquiring section 4d constituting the setting control unit 4A detects a wavelength of light inputted to the optical level adjusting unit 2A and outputs a result of the detection as received wavelength information to the optical level determining section 4b (step B1). In addition, the optical level determining section 4b determines an optical level adjusted quantity in the optical level adjusting unit 2A on the basis of the received wavelength information from the reception wavelength information acquiring section 4a so that the level of light to be outputted to the light receiving unit 3 becomes relatively lower in shorter wavelength band than in longer wavelength band (steps A3 to A5).

Concretely, in the case of using a C band (1530 nm to 1560 nm) as a transmission wavelength band, as mentioned above with reference to FIG. 8, when the received wavelength is within the second band which is a range approximately from 1535 nm to 1560 nm, the output optical power of the optical level adjusting unit 2A (or the input optical power to the light receiving unit 3) is determined to P2 (step B2, and step B4 through the "second band" route). On the other hand, when the received wavelength is within the first band which is a range approximately from 1530 nm to 1535 nm, the output optical power of the optical level adjusting unit 2A is determined to P1 which is lower than the value (P2) in a case in which it is within the second band (step B2, and step B3 through the "first band" route).

Moreover, the setting signal outputting section 4c outputs a setting signal to the optical level adjusting unit 2A so that the optical level to be outputted from this optical level adjusting unit 2A reaches the optical level determined by the optical level determining section 4b. Accordingly, the optical level adjusting unit 2A carries out the optical level adjustment on the basis of the setting signal inputted from the setting signal outputting section 4c so that the output optical level therefrom becomes the optical level determined by the optical level determining section 4b (steps B3 and B4).

Thus, with the optical receiving apparatus 1B according to the third embodiment, since the information on a wavelength of light to be inputted to this optical receiving apparatus 1B is previously obtainable on the basis of the inputted light through the detection operation, in a manner such that the input optical power to the light receiving unit 3 is previously set in accordance with that optical wavelength as well as the case of the above-described second embodiment, even if a variation of a transmission optical wavelength other than an optical wavelength to be inputted occurs, the optical power to be inputted to the light receiving unit 3 can be placed within a light reception tolerable range as well as the case of the above-described first embodiment, which provides an advantage of carrying out the signal light reception normally.

Although also in the third embodiment the optical level determining section 4b is designed to determine one of two types of optical powers P1 and P2 according to whether the received wavelength is within the first band or within the second band, according to the present invention, it is also appropriate that the optical power is determined in a different mode, provided that at least the level of light to be outputted to the light receiving unit 3 becomes relatively lower when the received wavelength is within a shorter wavelength band than when being within a longer wavelength band.

[D] Description of Fourth Embodiment

Figure 11:
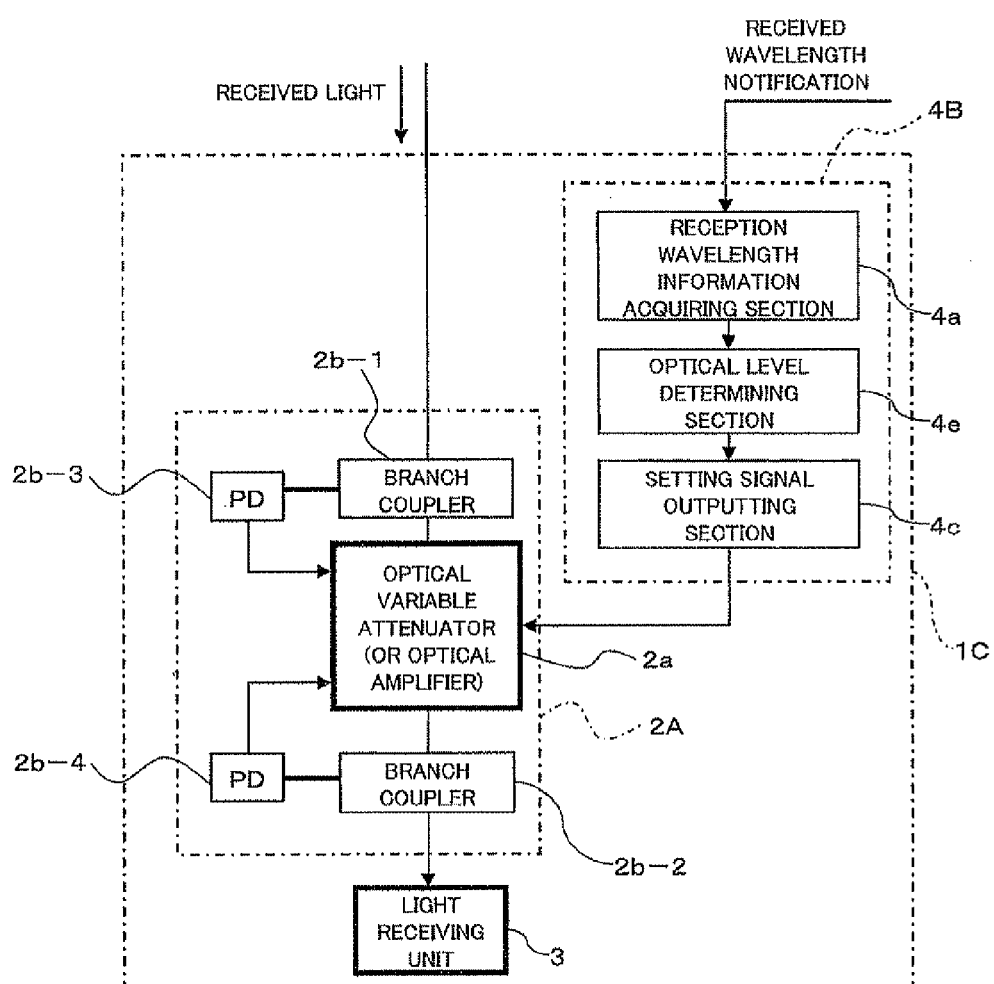
FIG. 11 is an illustration of an optical receiving apparatus according to a fourth embodiment of the present invention.

FIG. 11 is an illustration of an optical receiving apparatus 1C according to a fourth embodiment of the present invention. The optical receiving apparatus 1C shown in FIG. 11 differs in a configuration of a setting control unit 4B from that (see reference numeral 1A) in the above-described second embodiment, but other configurations are basically the same as those of the optical receiving apparatus 1A according to the second embodiment. In FIG. 11, the same reference numerals as those used in FIG. 6 designates almost same parts.

In this case, the setting control unit 4B is equipped with an optical level determining section 4e different from that in the setting control unit 4 according to the above-described second embodiment. That is, the optical level determining section 4e is configured as a level deriving section adapted to derive the level of light to be outputted to the light receiving unit 3 through the use of arithmetic operations using, as a parameter, the information on a wavelength of received light which is acquired by the reception wavelength information acquiring section 4a. In this configuration, the optical level determining section 4e functioning as a level deriving section is capable of carrying out the arithmetic operations on the basis of the received wavelength information acquired by the reception wavelength information acquiring section 4a so that the optical level to be outputted to the light receiving unit 3 is determined so as to become higher linearly from the shorter-wavelength side according to the wavelength of the received light.

The setting signal outputting section 4c outputs a setting signal to the optical level adjusting unit 2A for obtaining the output optical level determined by the optical level determining section 4e.

Figure 12:
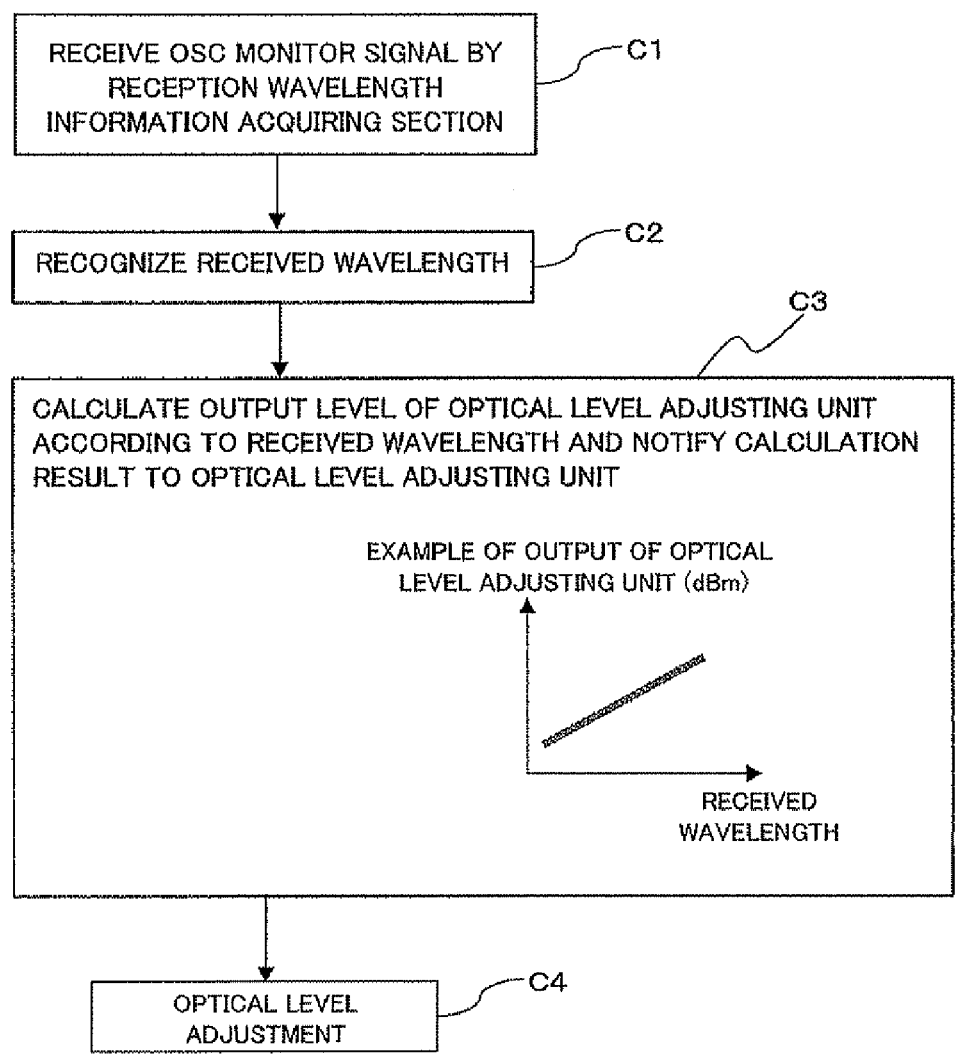
FIG. 12 is a flowchart useful for explaining an operation of the optical receiving apparatus according to the fourth embodiment of the present invention.

In the optical receiving apparatus 1C configured as mentioned above, as shown in the flow chart of FIG. 12, the reception wavelength information acquiring section 4a constituting the setting control unit 4B extracts the information on a received optical wavelength from, for example, an OSC monitor signal light inputted from the external (step C1) and outputs it to the optical level determining section 4e (step C2).

In addition, the optical level determining section 4b derives and determines an optical level through the use of arithmetic operations using, as a parameter, the received wavelength information from the reception wavelength information acquiring section 4a so that the optical level becomes higher linearly from the shorter-wavelength side according to the wavelength of the received light (step C3). Still additionally, the setting signal outputting section 4c outputs a setting signal to the optical level adjusting unit 2A for obtaining the output optical level determined by the optical level determining section 4e. Thus, the optical level adjusting unit 2A adjusts the optical level on the basis of the setting signal inputted from the setting signal outputting section 4c so that the output optical level reaches the optical level determined by the optical level determining section 4b (step C4).

As described above, also in the optical receiving apparatus 1C according to the fourth embodiment, it is possible that the optical level determining section 4e derives the optical level to be outputted to the light receiving unit 3 through the use of arithmetic operations employing, as a parameter, the information acquired by the reception wavelength information acquiring section 4a and the optical level adjusting unit 2A sets the output optical power at the derived optical power, so the advantages similar to those of the above-described respective embodiments are attainable.

[E] Others

It should be understood that the present invention is not limited to the above-described embodiments, and that it is intended to cover all changes and modifications of the embodiments of the invention herein which do not constitute departures from the spirit and scope of the invention.

For example, although the above-described respective embodiments employ, as an optical receiving apparatus, a configuration adapted to receive light with a single wavelength, as shown in FIG. 2, the present invention can employ, as an optical receiving apparatus, a configuration including a plurality of optical receivers 101 integrally.

In this case, optical level adjusting units (reference numerals 2 and 2A in FIGS. 1, 6, 9 and 11) constituting the plurality of optical receivers 101 shown in FIG. 2 are made as a plurality of wavelength-unit optical level adjusting sections designed to adjust the levels of a plurality of inputted lights, wavelength-demultiplexed and different from each other, in units of wavelengths demultiplexed, respectively. Likewise, light receiving units (reference numerals 3 in FIGS. 1, 6, 9 and 11) constituting the plurality of optical receivers 101 are configured as a plurality of wavelength-unit light receiving sections designed to receive lights outputted from the plurality of wavelength-unit optical level adjusting sections 2, 2A, respectively. In each of the respective wavelength-unit optical level adjusting sections 2, 2A, the optical level adjusted quantity is set so that the level of light to be outputted to the corresponding wavelength-unit light receiving unit becomes relatively lower when the received wavelength is within a shorter wavelength band than when existing within a longer wavelength band.

Moreover, through the disclosure of the above-mentioned embodiments, a person skilled in the art can manufacture the apparatus according to the present invention.

What is claimed is:

1. An optical receiving apparatus, which receives light demultiplexed according to wavelength in a wavelength multiplex optical transmission system, the optical receiving apparatus comprising:
    an optical level adjuster that adjusts a level of light inputted and outputs the level-adjusted light; and
    a receiver that receives the light outputted from said optical level adjuster, wherein
    an optical level adjusted quantity in said optical level adjuster being set so that the level of light of relatively shorter wavelength band becomes relatively lower than the level of light of relatively longer wavelength band, and wherein
    said optical level adjuster includes a plurality of wavelength-unit optical level adjusters that adjusts levels of a plurality of inputted lights, demultiplexed according to wavelength and different from each other, in units of demultiplexed wavelengths and outputs the inputted lights, and
    said receiver is configured as a plurality of wavelength-unit light receivers that receives lights outputted from said plurality of wavelength-unit optical level adjusters, respectively,
    an optical level adjusted quantity in each of said plurality of wavelength-unit optical level adjusters being set so that the level of light of relatively shorter wavelength band becomes relatively lower than the light of relatively longer wavelength band.

2. The optical receiving apparatus according to claim 1, wherein said wavelength multiplex optical transmission system includes an optical add/drop node made to carry out add/drop for each wavelength of wavelength multiplexed light, and the optical receiving apparatus is designed to receive light with a wavelength dropped by said optical add/drop node.

3. The optical receiving apparatus according to claim 1, further comprising a controller that controls and sets said optical level adjuster so that the level of light of relatively shorter wavelength band becomes relatively lower than the level of light of relatively longer wavelength band.

4. The optical receiving apparatus according to claim 3, wherein said controller includes:
    a reception wavelength information acquire that acquires information on a wavelength of light to be received;
    an optical level determiner that determines an optical level to be outputted from said optical level adjuster to said receiver on the basis of the information acquired by said reception wavelength information acquirer; and
    a setting signal outputting section that outputs, to said optical level adjuster, a setting signal which is for setting the optical level, determined by said optical level determiner, as a set level of light to be outputted to said receiver.

5. The optical receiving apparatus according to claim 4, wherein said reception wavelength information acquirer is adapted to receive a monitor signal in said wavelength multiplex optical transmission system for acquiring the information on the basis of the monitor signal.

6. The optical receiving apparatus according to claim 4, wherein said reception wavelength information acquiring section is configured as a wavelength detecting section adapted to detect a wavelength of light to be inputted to said optical level adjusting unit.

7. The optical receiving apparatus according to claim 4, wherein said optical level determining section is configured as a level deriving section adapted to derive a level of light to be outputted to said light receiving unit through the use of arithmetic operations using, as a parameter, the information on the wavelength of the received light which is acquired by said reception wavelength information acquiring section.

8. The optical receiving apparatus according to claim 4, wherein, on the basis of the information acquired by said reception wavelength information acquirer, said optical level determiner determines the level of light to be outputted to said receiver at a lower value when the wavelength of the received light is within a first band than when the wavelength of the received light is within a second band which is a band on a longer-wavelength side with respect to the first wavelength band.

9. The optical receiving apparatus according to claim 4, wherein said optical level determining section determines the level of light to be outputted to said light receiving unit on the basis of the information acquired by said reception wavelength information acquiring section so that the light level becomes higher linearly from the shorter-wavelength side according to the wavelength of the received light.

10. The optical receiving apparatus according to claim 8, wherein the first band is set at 1530 nm to 1535 nm in a case in which a wavelength band of said wavelength multiplex optical transmission system is set at a C band.

11. The optical receiving apparatus according to claim 4, wherein said optical level adjuster includes an optical variable attenuator that attenuates inputted light by an attenuated quantity set variably on the basis of the setting signal from said setting signal outputting section and a monitoring section that monitors inputted optical level or outputted optical level to or from said optical variable attenuator, and
    said optical variable attenuator attenuates the inputted light to the set level on the basis of a result of monitoring by said monitoring section and outputs the attenuated light to said receiver.

12. The optical receiving apparatus according to claim 4, wherein said optical level adjuster includes an optical amplifier that amplifies inputted light with a gain set variably and a monitoring section that monitors a level of inputted light or outputted light to or from said optical amplifier, and
    said optical amplifier amplifies the inputted light up to the set level on the basis of a result of monitoring by said monitoring section and outputs the amplified light to said receiver.

13. An optical level adjusted quantity setting method for an optical receiving apparatus, which receives light demultiplexed according to wavelength in a wavelength multiplex optical transmission system, comprising an optical level adjuster that adjusts a level of light inputted and outputs the level-adjusted light, and a receiver that receives the light outputted from said optical level adjuster, the optical level adjusted quantity setting method comprising:

acquiring information on a wavelength of light received; and setting an optical level adjusted quantity in said optical level adjuster on the basis of the acquired information so that a level of light to be outputted to said receiver becomes relatively lower when a received wavelength exists within a shorter-wavelength band than when existing within a longer-wavelength band, wherein said optical level adjuster includes a plurality of wavelength-unit optical level adjusters that adjusts levels of a plurality of inputted lights, demultiplexed according to wavelength and different from each other, in units of demultiplexed wavelengths and outputs the inputted lights, and said receiver is configured as a plurality of wavelength-unit light receivers that receives lights outputted from said plurality of wavelength-unit optical level adjusters, respectively, an optical level adjusted quantity in each of said plurality of wavelength-unit optical level adjusters being set so that the level of light of relatively shorter wavelength band becomes relatively lower than the light of relatively longer wavelength band.

* * * * *

UNITED STATES PATENT AND TRADEMARK OFFICE
CERTIFICATE OF CORRECTION

| | | |
|---|---|---|
| PATENT NO. | : 8,050,574 B2 | Page 1 of 1 |
| APPLICATION NO. | : 12/043466 | |
| DATED | : November 1, 2011 | |
| INVENTOR(S) | : Miki Onaka | |

It is certified that error appears in the above-identified patent and that said Letters Patent is hereby corrected as shown below:

Column 17, Line 60, In Claim 4, delete "acquire" and insert -- acquirer --, therefor.

Signed and Sealed this
Twenty-fourth Day of January, 2012

David J. Kappos
*Director of the United States Patent and Trademark Office*